United States Patent [19]

Gordon

[11] 4,284,995

[45] Aug. 18, 1981

[54] METHODS AND APPARATUS FOR RECORDING INFORMATION, SUPPLYING WOUND MATERIALS AND RETAINING TUBULAR OBJECTS

[75] Inventor: Gary G. Gordon, Newhall, Calif.

[73] Assignee: Bell & Howell Company, Chicago, Ill.

[21] Appl. No.: 49,537

[22] Filed: Jun. 18, 1979

[51] Int. Cl.³ .................. G01D 15/24; G01D 15/26; G01D 15/34; B65H 17/02
[52] U.S. Cl. ......................... 346/136; 242/18 DD; 242/68.4; 242/129.51
[58] Field of Search .................. 346/110, 136; 242/18 DD, 68.4, 129.51, 78.6, 68.1, 68.2, 68.5, 68.6, 55.2, 58.4, 61, 67.2, 3 R, 56 R, 65, 75, 45; 403/253

[56] References Cited

U.S. PATENT DOCUMENTS

| | | | |
|---|---|---|---|
| 829,185 | 8/1906 | Votley | 242/68.4 |
| 1,531,705 | 3/1925 | Little | 242/67.3 R |
| 1,676,797 | 7/1928 | Nyman | 242/75.45 |
| 1,693,876 | 12/1928 | Unruh, Jr. | 242/58.4 |
| 1,702,971 | 2/1929 | Jeffress | 242/61 |
| 1,724,034 | 8/1929 | Mayer | 403/253 |
| 3,104,073 | 9/1963 | Post | 242/67.2 |
| 3,216,021 | 11/1965 | Stefansson | 346/136 |
| 3,322,359 | 5/1967 | Dales et al. | 242/68 |
| 3,360,210 | 12/1967 | Frisbie | 242/65 |
| 3,368,769 | 2/1968 | Obenshain | 242/68.4 |
| 3,497,157 | 2/1970 | Iualdi | 242/67.3 |
| 3,539,126 | 11/1970 | Meserve | 242/56 R |
| 3,720,385 | 3/1973 | Staats | 242/68.5 X |
| 3,792,825 | 2/1974 | Kampf | 242/67.3 R |
| 3,941,320 | 3/1976 | Strunk | 242/18 DD |
| 3,955,770 | 5/1976 | Offerman | 242/68.4 |

FOREIGN PATENT DOCUMENTS

| | | |
|---|---|---|
| 1899660 | 6/1963 | Fed. Rep. of Germany . |
| 207559 | 12/1923 | United Kingdom . |
| 757325 | 9/1956 | United Kingdom . |
| 1038909 | 8/1966 | United Kingdom . |
| 1083716 | 9/1967 | United Kingdom . |
| 1146525 | 3/1969 | United Kingdom . |
| 1241696 | 8/1971 | United Kingdom . |
| 1300378 | 12/1972 | United Kingdom . |
| 1381634 | 1/1975 | United Kingdom . |
| 1388142 | 3/1975 | United Kingdom . |
| 1408938 | 10/1975 | United Kingdom . |
| 1471361 | 4/1977 | United Kingdom . |

*Primary Examiner*—Richard A. Wintercorn
*Attorney, Agent, or Firm*—Benoit Law Corporation

[57] ABSTRACT

Apparatus and methods for releasably retaining any one of several tubular objects of different lengths between a pair of mutually adjustable retention members employ a supporting rod. One of the retention members is mounted on the supporting rod which is inserted into any one of said tubular objects. The other of the retention members is moved along the supporting rod to place the retention members against opposite ends of said one tubular object. The placed retention members are then locked against movement away from each other.

61 Claims, 3 Drawing Figures

METHODS AND APPARATUS FOR RECORDING INFORMATION, SUPPLYING WOUND MATERIALS AND RETAINING TUBULAR OBJECTS

BACKGROUND OF THE INVENTION

1. Field of the Invention

The subject invention relates to oscillography and oscillographs and other recording methods and recorders, to methods and apparatus for supplying wound material from rolls of diminishing diameter and other winding and reeling methods and apparatus, to methods and apparatus for releasably retaining any one of several tubular objects of different lengths, and to combinations of such methods and apparatus.

2. Disclosure Statement

This disclosure statement is made pursuant to the duty of disclosure imposed by law and formulated in 37 CFR 1.56(a). No representation is hereby made that information thus disclosed in fact constitutes prior-art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material.

The advanced type of recording medium transport mechanism disclosed in U.S. Pat. No. 3,216,021 is typical of prior-art equipment which required the recording material to be disposed on a core with laterally projecting shafts on the supply and takeup sides. U.S. Pat. Nos. 1,531,705, 1,676,797, 3,360,210, 3,497,152, 3,539,126 and 3,720,385 propose various winding devices and similar apparatus which in one form or another appear to share the latter drawback; impairing a desired versatility of such systems, requiring typically extra rewinding operations of the wound materials, and rendering paper or other material size changes often difficult.

In the prior-art equipment under consideration, there also exists a need for more convenient and effective supply roll mounting systems for accommodating supply rolls located on tubular supports of different lengths. In more general terms, there exists a need for methods and apparatus for releasably retaining any one of several tubular objects of different lengths.

In this respect, an early proposal according to U.S. Pat. No. 1,693,876 employs conical cable drum retaining members which are rotatably mounted on a pair of spaced standards. In practice, there existed the drawback that at least an entire standard had to be moved to accommodate cable drums of different widths. To somewhat alleviate this problem, the proposal according to U.S. Pat. No. 3,955,770 mounts the coil-supporting assemblies on tracks for sliding movement toward and away from each other.

The proposal according to U.S. Pat. No. 1,702,971 employs flat paddles for supporting bolts of cloth preparatory to and during unwinding operations. One of the paddles is rotatably mounted on a standard which, together with a tubular track extending parallel to an axis through the paddles, is attached to the floor. The other paddle is rotatably mounted on a standard which, in turn, is supported on a tubular carriage riding in the mentioned tubular track. A spring has opposite ends attached to, and extends through the tubular track and carriage; biasing the carriage into the tubular track. A locking device arrests the motion of the carriage relative to the tubular track at any one of several incremental positions in order to permit an accommodation of bolts of cloth of different widths. In so arresting the motion of the carriage, the locking device also renders the mentioned spring ineffective from exercising a biasing function on the cloth retaining paddles.

In practice, the latter drawback coupled with an only step-wise adjustability of the distance between the paddles would render that prior-art system unsuitable for releasably retaining tubular members or supply rolls of different lengths.

An infinitely adjustable spacing between supply roll retention members appears possible in the system disclosed in U.S. Pat. No. 3,104,073. However, the use of a tool and the carrying out of set screw releasing and tightening operations are then required or each change in supply roll width.

A later proposal according to U.S. Pat. No. 3,941,320 appears only suitable for clamping tubular supply roll supports of a given length.

A proposal according to U.S. Pat. No. 3,792,825 uses spring clamps acting on the outside of a supply roll for retaining same in a chart drive system. That principle appears to be rather limited to the handling of perforated paper rolls. The latter patent also proposes the use of pads as braking devices. Again, there appears to be a design limitation to particular chart roll materials.

A more universally applicable tension regulator has been proposed in U.S. Pat. No. 1,676,797 wherein a roller rests on the outside of the supply roll to sense its diminishing diameter during unwinding of the material from the supply roll. That sensing roller is rotatably mounted in an arm which is spring biased to maintain the sensing roller in contact with the supply roll. That arm also transmits the motion of the sensing roller along a circular trajectory through the axis of rotation of the supply roll to a friction head or button that rides on a circular friction surface rotating with the supply roll.

The subsequent U.S. Pat. No. 3,720,385 alludes to drawbacks in the latter prior-art tensioning system and, in turn, proposes to do away with the need for a spring bias of the roll diameter sensor by placing cylindrical sensing means as well as correponding brake means at loci beyond points of tangency between a circle of a diameter of the effective braking disk diameter and a tangential line passing through the pivot point of follower arms to which the sensing and braking means are attached.

In practice, the latter proposal, in turn, has the drawback of operating only in one sense of rotation of the supply roll. This is a particular disadvantage if supply rolls containing a recording material having an information recording surface layer facing inwardly and supply rolls containing a recording medium having a recording surface layer facing outwardly are to be employed alternatively in the particular system. Moreover, the sensing rolls or cylindrical members of prior-art tension regulators often have eventuated the formation of bumps or other warped conditions in the supply roll.

The copending Patent Application Ser. No. 925,498, filed July 17, 1978, by Lawrence Vincent Maldarelli, for Methods and Apparatus for Recording Information, Supplying Wound Materials and Retaining Tubular Objects, assigned to the subject assignee and herewith incorporated by reference herein, discloses several methods and apparatus as suggested by its title. For instance, that copending application discloses tubular member and recording medium roll retention systems wherein one of two locked retention members is resiliently biased against a retained tubular object.

While that retention system performs excellently, its implementation so far has been rather expensive and the mentioned bias has tended to require a rather sturdy construction due to side loads. There thus exists a need for a less costly and typically lighter system essentially free from side load effects.

SUMMARY OF THE INVENTION

It is a general object of this invention to alleviate or avoid the above mentioned disadvantages and to satisfy the above mentioned needs.

It is a germane object of this invention to provide improved methods and apparatus for releasably retaining any one of several tubular objects of different lengths.

It is also an object of this invention to provide improved methods and apparatus for supplying wound material from any out of several different rolls;

It is a related object of this invention to provide improved methods and apparatus for supplying wound material from a roll of diminishing diameter located on a tubular support.

It is also an object of this invention to provide improved methods and apparatus for recording information.

It is a related object of this invention to provide improved methods of oscillography and oscillograph apparatus.

It is also an object of this invention to provide novel combinations of features leading to improved oscillography and oscillographs or other information recording systems; including combinations of methods or apparatus for supplying wound material from a roll of diminishing diameter located on a tubular support with methods and apparatus for releasably retaining any one of several tubular objects of different lengths.

A related object of this invention concerns the provision of improved oscillography and oscillographs or other information recording systems by combining the latter combination with a system for bidirectionally controlling the tension of the material unwinding from a supply roll.

It is a related object of this invention to provide improved recording medium or master record transports and transporting methods for oscillography, facsimile and printout systems.

It is a specific object of this invention to provide improved paper, recording medium and master record transports for the oscillography, facsimile, printout and other equipment disclosed in copending United States Patent Application Ser. No. 776,157, filed Mar. 10, 1977, by John H. Jacobs, for Light Gate Utilization Methods and Apparatus, assigned to the subject assignee and herewith incorporated by reference herein.

Other objects of this invention will become apparent in the further course of this disclosure.

From a first aspect thereof, the subject invention resides in a method of releasably retaining any one of several tubular objects of different lengths between a pair of mutually adjustable retention members. More specifically, the invention according this aspect resides in the improvement comprising in combination the steps of providing a supporting rod, mounting one of said retention members on said supporting rod, inserting said supporting rod into any one of said tubular objects, moving the other of said retention members along said supporting rod to place said retention members against opposite ends of said one tubular object, locking said placed retention members against movement away from each other, mounting said supporting rod, and resiliently biasing said supporting rod in an axial direction.

From another aspect thereof, the subject invention resides in a method of supplying wound material from any one of several rolls of wound material located on different tubular supports of different lenghts, with the aid of a pair of mutually adjustable retention members. The invention according to this aspect resides, more specifically, in the improvement comprising in combination the steps of providing a supporting rod, mounting one of said retention members on said supporting rod, inserting said supporting rod into any one of said tubular supports having a roll of material wound thereon, moving the other of said retention members along said supporting rod to place said retention members against opposite ends of said one tubular support, locking said placed retention members against movement away from each other, mounting said supporting rod for rotation about an axis, resiliently biasing said supporting rod in an axial direction, maintaining said resilient bias of said supporting rod during removal of said wound material, and removing wound material from said roll and rotating said one tubular support and said supporting rod.

From another aspect thereof, the subject invention resides in a method of recording information at a recording station on a recording medium strip supplied from any one of several supply rolls located on different tubular supports of different lengths. The invention according to this aspect resides, more specifically, in the improvement comprising in combination the steps of providing a supporting rod, providing a pair of retention members, mounting one of said retention members on said supporting rod, inserting said supporting rod into any one of said tubular supports having a supply roll of a recording medium strip wound thereon, moving the other of said retention members along said supporting rod to place said retention members against opposite ends of said one tubular support, locking said placed retention members against movement away from each other, mounting said supporting rod for rotation about an axis, moving the latter recording medium strip from said roll to said recording station and rotating said one tubular support and said supporting rod, and recording information on the latter recording medium strip at the recording station.

From another aspect thereof, the subject invention resides in an apparatus for releasably retaining any one of several tubular objects of different lengths, comprising, in combination, a supporting rod insertable into any one of said tubular objects, a pair of mutually adjustable retention members on said supporting rod for releasably retaining any one of said tubular objects therebetween, means connected between said retention members for selectively locking said retention members against movement away from each other, means coupled to said supporting rod for mounting said supporting rod, and means coupled to said supporting rod for resiliently biasing said supporting rod in an axial direction.

From another aspect thereof, the subject invention resides in an apparatus for supplying wound material located on different tubular supports of different lengths, comprising, in combination, a supporting rod insertable into any one of said tubular supports having a roll of material wound thereon, a pair of mutually adjustable retention members on said supporting rod for releasably retaining any one of said tubular supports therebetween, means connected between said retention members for selectively locking said retention members against movement away from each other, means coupled to said supporting rod for resiliently biasing said supporting rod in an axial direction at least after said locking of said retention members, and means coupled to said supporting rod for mounting said supporting rod for rotation about an axis.

From another aspect thereof, the subject invention resides in apparatus for recording information at a recording station on a recording medium strip supplied from any one of several supply rolls located on different tubular supports of different lengths, comprising, in combination, a supporting rod insertable into any one of said tubular supports having a supply roll of a recording medium strip thereon, a pair of mutually adjustable retention members on said supporting rod for releasably retaining any one of said tubular supports therebetween, means connected between said retention members for selectively locking said retention members against movement away from each other, means coupled to said supporting rod for mounting said supporting rods for rotation about an axis, means for moving the latter recording medium strip from said roll to said recording station and rotating said one tubular support, and means for recording information on the latter recording medium strip at the recording station.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
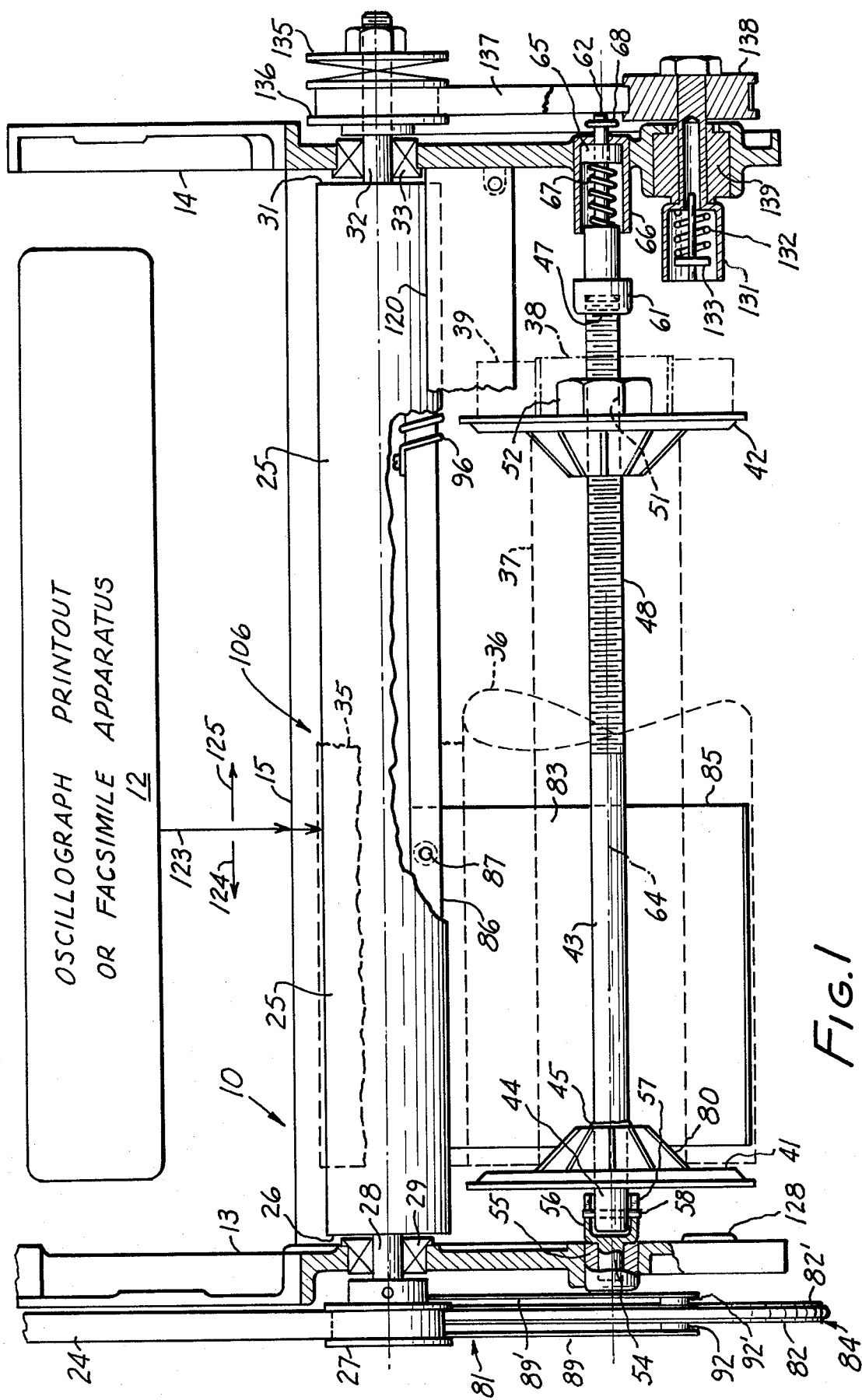
FIG. 1 is a top view, partially in section, of a paper transport for or of an oscillograph apparatus in accordance with a preferred embodiment of the subject invention.

The paper transport according to the illustrated preferred embodiment of the subject invention has utility in all kinds of systems wherein wound paper, recording medium strips or sheets or other materials are to be transported from a supply roll. Without limiting the generality of the foregoing, the subject transport has particular utility in advancing and handling recording media and master records in the oscillograph, printout or facsimili apparatus disclosed in the above mentioned copending Patent Application Ser. No. 776,157 and shown symbolically at 12 in FIG. 1.

Despite the variety of potential and practical uses of various aspect of the subject invention, the illustrated preferred embodiment is herein simply referred to as "paper transport," without any limiting intent.

The paper transport 10 has a frame or support structure including a lateral frame or upright mounting plate 13 and a lateral frame or upright mounting plate 14 interconncted by a rail 15. In addition, the frame structure may include a baseplate, as well as a housing (not shown) which, particularly in the case of electro-optical apparatus, would be of a light-tight type.

The paper transport 10 has an electric motor 17 attached to the mounting plate 13 and consituting a source of rotary drive power for various rotatable parts of the paper transport.

Figure 2:
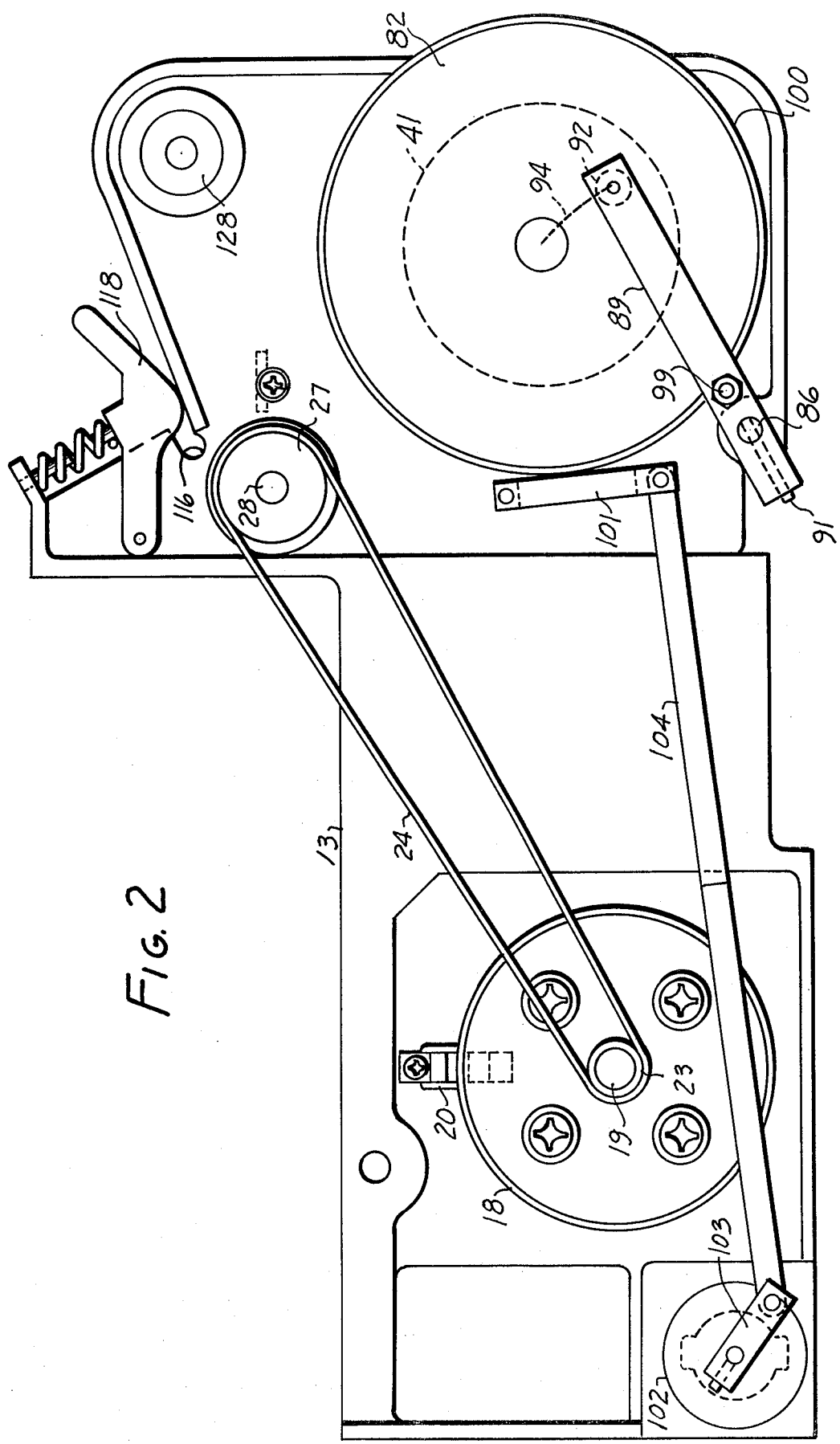
FIG. 2 is a side view of the transport as seen from the left-hand side of FIG. 1.

As shown in FIG. 2, the motor 17 may have a shutter wheel 18 attached to its drive shaft 19 for generating, with the aid of an electrooptical pickup 20, a train of electrical pulses varying directly with paper velocity. These may be used to scale the rate of deposition of information onto the recording medium, such that the information is recorded at the same relative size regardless of paper speed. In addition, since any paper movement results in a finite number of pulses being generated, the output of electrooptical pickup 20 may be counted and this information utilized to stop the transport after a predetermined length of the recording medium has been transported. The shutter wheel 18 also incorporates output pulley 23 of the motor 17.

A transmission belt 24 engages the motor output pulley 23 and applies rotary drive power to a drive roller 25 at one end 26 thereof via a drive pulley 27. The drive roller 25 has a shaft 28 extending through a bearing 29 in the side plate 13 to the drive pulley 27 at the one end 26. At the other end 31, the drive roller 25 has a shaft 32 extending through a bearing 33 in the side wall 14 of the transport frame.

Figure 3:
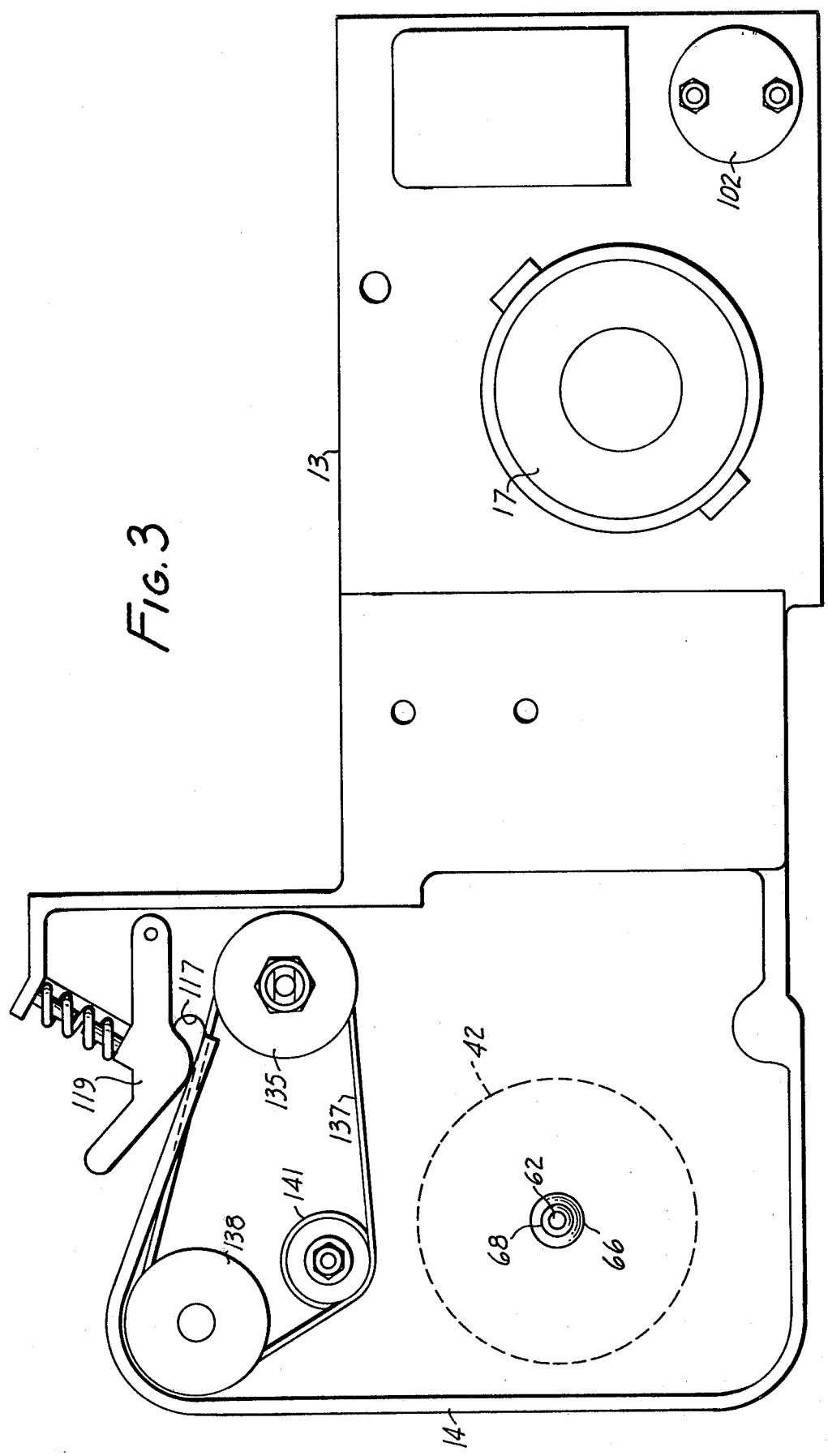
FIG. 3 is a further side view of the transport as seen from the right-hand side of FIG. 1.

An aspect of the subject invention relating to methods and apparatus for releasably retaining any one of several tubular objects of different lengths will now be disclosed with the aid of FIGS. 1, 2 and 3 in accordance with the illustrated preferred embodiment.

In particular, FIG. 2 shows a supply of wound material, such as an oscillograph paper or other recording medium 35, situated in a roll 36 on a tubular support 37, such as a cardboard tube, indicated in dotted lines.

The paper transport according to the illustrated preferred embodiment of the subject invention is capable of handling oscillograph papers and other recording media of different widths. Accordingly, the tubular supports of various supply rolls usable in the illustrated equipment may be of different lengths.

By way of example, FIG. 1 partially shows by a dotted outline 38 a longer tubular support for a oscillograph paper supply roll 39 of more width than the supply roll 36. The tubular support 38 may also have a diameter different from the diameter of the tubular support 37.

In practice, all these different oscillograph paper widths and tubular support lengths have to be accommodated in the illustrated apparatus. To this end, the transport 10 has a pair of mutually adjustable retention members 41 and 42 and a supporting rod 43 insertalbe into any one of the tubular objects 37, 38, etc.

The retention member 41 is mounted on the supporting rod 43. In the illustrated preferred embodiment the retention member 41 is attached to the supporting rod 43 near one end 44 thereof, as seen at 45.

The other retention member 42 is also mounted or located on the supporting rod 43, as seen in FIG. 1. The members 41 and 42 constitute a pair of mutually adjustable retention members on the supporting rod 43 for releasably retaining any one of the tubular objects indicated at 37 and 38 therebetween.

In the illustrated embodiment, the retention member 42 is axially movable on, and removable from an end 47 of, the supporting rod 43. Preferably, the retention member 42 is infinitely adjustable along a portion of the supporting rod.

According to the illustrated preferred embodiment of the invention, the supporting rod 43 is provided with an external thread 48 along a portion thereof. In particular, the external thread 48 runs from the end 47 along a portion of the supporting rod 48 of such length as to accommodate all lengths of the tubular members or supports indicated at 37 and 38 by way of example.

The retention member 42 is provided with an internal thread, such as the thread 51 in a hexagonally headed bushing or nut 52 attached or connected to the retention member 42 and meshing with the external thread 48 on the supporting rod 43. The nut 52 or internal thread 51, in conjunction with the thread 48 on the supporting rod 43, thus constitute a means connected to the retention member 42 for axial movement of the retention member 42 on the supporting rod, and for infinite adjustment of the retention member 42 along a portion of the supporting rod as well.

A spindle 54 is rotatable in a bushing 55 in the side plate 13 and has a socket 56 for receiving the end portion 44 of the supporting rod 43. The socket 56 has a pair of diametrically opposite axial slots 57 for receiving lateral projections 58 of the supporting rod 43.

Slots 57 and corresponding projections 58 may be omitted if it is merely desired to mount the supporting rod 43 rotatably, without coupling to any other member.

The other end 47 of the supporting rod 43 is insertable into a cup 61 mounted on or integral with a shaft 62. That shaft 62, as well as the previously mentioned spindle 54, is in line with the longitudinal axis 64 of the supporting rod. In particular, the shaft 62 is rotatably mounted in, and extends through, a bearing 65 which, in turn, is mounted in a bearing holder 66 in the apparatus side wall 14.

A spring 67 axially biases the cup 61 in the direction of the spindle 54 or socket 56 against the restraint of a stop 68 on the shaft 62.

Preparatory to the mounting of a tubular object or support 37 or 38, the supporting rod 43 with retention members 41 and 42 is moved axially to the right as seen in FIG. 1, and is removed from the socket 56 and cup 61. The retention member 42 is then removed or unscrewed from the supporting rod 43 and the rod 43 is inserted into either tubular object or support 37 or 38 until an end of such object or support abuts the retention member 41 located on the rod 43. Alternatively, the rod 43 may be slid axially into either tubular object or support 37 or 38 until the retention member 41 abuts an end of such tubular object or support.

The previously removed retention member 42 is then put or screwed back onto the supporting rod 43 from the end portion 47 thereof. In general, the retention member 42 is moved along the supporting rod 43, such as by rotation relative to the supporting rod in the case of a threaded supporting rod, in order to place the retention members 41 and 42 against opposite ends of the tubular object 37 or 38.

In this manner, tubular objects or tubular supports of recording medium rolls of various diameters and widths or lengths may readily be accommodated between the retention members 41 and 42 on the supporting rod.

Once the retention members 41 and 42 have thus been placed into abutment with opposite ends of the particular tubular object or support 37 or 38, the thus placed retention members 41 and 42 are locked against movement away from each other. In the presently best mode contemplated, this locking is effected by making the pitch of the thread 48 such as to provide for a self-locking action between the rod 43 and nut 52 when the retention member 42 is tightened against the placed tubular object or support 37 or 38. Such tightening, and its subsequent untightening, may be facilitated by the use of a wrench (not shown) engaging the hexagonal head of the nut or retention member bushing 42.

In practice, the thread 48 on rod 43 and the meshing thread 51 in the unit or bushing 42 constitute an example of a means connected between the retention members 41 and 42 for selectively locking these retention members against movement away from each other. The subject invention thus not only permits an infinitesimal or stepless adjustment in the spacing between the retention members 41 and 42 for an accommodation to various tubular object or supply roll support sizes, but provides also a secure locking action for supply roll clamping purposes.

The assembly comprising the retention members 41 and 42, supporting rod 43, tubular support 37 (or 38) and supply roll 36 is mounted on the apparatus 10 by inserting the rod end 47 into the cup 61 and moving the assembly to the right as seen in FIG. 1, thereby moving the cup 61 against the bias of the spring 67 until the rod end 44 clears the socket 56. The rod end 44 is then inserted into the socket 56 while the bias of the spring 67 is permitted to move the cup 61 and rod 43 to the left as seen in FIG. 1 that is, toward the location of said socket. The rod 43 with retention members 41 and 42, tubular support 37 (or 38) and supply roll 36 assembled thereon, is thus mounted for rotation about rod axis 64.

While this aspect of the subject invention has been disclosed herein primarily in terms of releasable supply roll retention, it should be understood that the principles of this aspect are also applicable in general to the task of retaining any one of several tubular objects of different lengths between a pair of mutually adjustable retention members.

In the illustrated preferred embodiment, the spring 67 resiliently biases the supporting rod 43 in an axial direction. The mounted supporting rod is rotated about its axis 64, such as by removal of the recording medium or paper 35 from the roll 36, while the placed retention members 41 and 42 are locked against movement away from each other as explained above. In the illustrated preferred embodiment, the biasing function of the spring 67 includes the step of resiliently biasing the mounted supporting rod 43 in an axial direction while the supporting rod is rotated about is axis 64. This retains the rotating rod 43 securely between the socket 56 and cup 61.

Also in accordance with a preferred embodiment of the subject invention, wound material 35 may be supplied from any one of several rolls of wound material located on different tubular supports 37 or 38 of different lengths, with the aid of the mentioned pair of mutually adjustable retention members 41 and 42. In that case, the spring bias just described may again be provided and employed, if desired.

In accordance with a further preferred embodiment, a brake is provided such as shown at 81, 92 and 92', and the supporting rod 43 is releasably coupled at its one end 44 to the brake, as seen at 54 and 56 in FIG. 1. The spring 67 then resiliently biases the rotating supporting rod in an axial direction toward the mentioned brake. This in practice applies only a relatively small side loading force to the bearing 55 and to the brake, since clamping of the tubular support 37 (or 38) relies on the described locking action of the retention members, rather than on the strength of any spring bias.

The brake just mentioned may be exmployed in the context of a supply of wound material from a roll of diminishing diameter at bidirectionally controlled tension.

In terms of the illustrated preferred embodiment, it will be understood that the supply roll 36 diminishes in diameter as the paper or other sheet-like material 35 is unwound therefrom. It is the task of a mechanical servo system 81 to control the tension of the paper 35 bidirectionally; that is irrespective of the sense of rotation of the supply roll 36 as the paper 35 is unwound or pulled off therefrom.

To this end, the mechanical servo system 81 includes a pair of flat friction surfaces 82 and 83. One of these friction surfaces, namely the surface 82 is circular, being provided on a circular disk 84. The other of the pair of friction surfaces, namely the surface 83, is flat, being provided on a sheet of metal or flapper 85. The flapper 85 is attached to a shaft 86 by fasteners, one of which is seen at 87 in FIG. 1. In this manner, the flapper 85 is able to monitor the radius of the paper supply roll 36 for essentially constant paper tension. The shaft is journaled for angular movement about its longitudinal axis in the lateral mounting plates 13 and 14 of the frame structure.

An arm structure 89 is attached to a projecting end of the shaft 86 by a pin 91. At its outer extremity remote from the shaft 86, the arm structure 89 carries a friction pad 92 for generating friction on the surface 82.

The friction surface 82 or disk 84 is rotated about an axis 64 perpendicularly intersecting the surface 82 at a distance from the friction generating pad 92 and being the common axis of rotation of the rod 43 and retention members 41 and 42.

The disk 84 is mounted on the shaft of the spindle 54 so that the disk 84 with the friction surface 82 is coupled to the mounted rod 43 and retention members 41 and 42 for rotation therewith and with the supply roll 36 as the paper 35 is unwound therefrom.

The arm structure 89, being attached to the rotatable shaft 86, serves as a means for moving the friction generating pad 92 toward the intersection of the axis 48 with the friction surface 82 along a trajectory or arc of a circle 94 intersecting the axis 48. In practice, this enables an operation of the mechanical servo system 81 in either sense of rotation of the supply roll 36 and disk 84 or friction surface 82 while also enabling the development of a force tending to move the friction generating pad 92 toward the intersection of the axis 48 with the friction surface 82.

Referring to FIG. 2, if the supply roll is wound such that paper leaving the roll causes the surfaces 82 to rotate clockwise there will be generated a force component due to the action of pad 92 (or pads 92 and 92') against surface 82 (or surfaces 82 and 82') such that arm 89 and shaft 86 are also rotated clockwise. This force is overcome by helical spring 96 having one end attached to the lateral mounting plate 14 and the other end to shaft 86 at 97 and causing arm 89 and shaft 86 to rotate counterclockwise as viewed in FIG. 2. Should the supply roll be wound in the opposite direction, the surfaces 82 will rotate counterclockwise and a force will be generated tending to rotate arm 89 and shaft 86 counterclockwise. This force will add to the torsional moment generated by spring 96. Regardless of the direction of rotation of surfaces 82 there will be generated sufficient torsional moment applied to shaft 86 to keep monitor surfaces 83 in contact with supply roll 36 at all times as paper unwinds and diminishes the supply roll size.

In this manner, there is generated a torque in disk 84 that is directly proportional to supply roll diameter resulting in constant supply tension in the material being removed from the roll. The rubbing contact of monitor surface 83 with supply roll 36 adds to the supply web tension but, in practice, this force is small compared to total web tension and is relatively constant.

In operation, the flatness and relatively large area of the monitor surface 83 and flapper 85 effectively avoid the disadvantages of prior-art roll diameter rollers, including warping and bulging of the wound material on the roll. Concurrently, the arm structure 89 and its mounting, as well as the location of the friction pads 92 and its movement along the trajectory 94, avoid the prior-art drawback of restriction to operation in only one sense of rotation for the sake of generating the required torsional forces on the monitor shaft.

As seen in FIG. 1, both sides of the circular disk 84 may be utilized as friction surfaces 82 and 82'. The arm structure 89 may then be provided with a pair of arms, one of these carrying the pad 92 in frictional contact with the surface 82 and the other, shown at 89', carrying a friction pad 92' in frictional engagement with the friction surface 82'. An adjustable tensioning device 99, seen in FIG. 2, may be employed for tensioning the arm sections toward each other and the friction pads 92 and 92' into a desired engagement with the circular friction surfaces 82 and 82' on the disk 84.

As seen in FIG. 2, the friction servo disk 84 has a tire 100 which is selectively engaged by a brake 101 whenever power to the drive motor 17 is removed. A rotary solenoid 102 acts on the brake 102 via links 103 and 104. In particular, the solenoid 102 is energized briefly to engage the brake 101 with the tire 100 each time power to the motor 17 is removed. Power is supplied to the solenoid 102 only long enough to cause brake 101 to be applied to the tire 100 to stop the rotation of the supply roll 36 rapidly.

The drive roller 25 is rotatably mounted at a recording station 106 including the oscillograph, printout or facsimile apparatus 12 shown by a block in FIG. 1.

In practice, the recording medium strip 35 is run from the supply roll 36 about part of the drive roller 25 with the information recording surface layer facing away from the drive roller 25 at the recording station 106 irrespective of the direction in which the recording surface layer faces on the supply roll.

The lateral mounting plates 13 and 14 are provided with notches 116 and 117 near the drive roller 25 for receiving the shaft or shaft ends of an idler roller (not shown) which presses the recording medium strip 35 against the drive roller 25.

Manually actuable spring bias grips are provided adjacent the notches 116 and 117 for releasably retaining the idler roller 113 via shaft or shaft ends 114 at the drive roller 25.

The idler roller 113 causes sufficient frictional force to be developed between drive roller 25 and recording medium 35 so that it is withdrawn from the supply roll 36 and discharged from the recording station 106 as the information recording operation proceeds.

The recording medium strip is thus driven through the recording station and information is recorded on successive portions of the recording medium strip while each of these portions is located on the drive roller 25 with its information recording surface layer facing away from the drive roller. An arrow 123 in FIG. 1 indicates the luminous output in the case of an oscillograph apparatus, or the luminous sensing beam in the case of facsimile equipment, or then another stimulus in the case of a printout peripheral. Arrows 124 and 125 in FIG. 1 indicate that the beam 123 typically is deflected laterally during operation of the equipment.

If desired, the recording medium strip 35, after having run past the recording station and the drive roller 25, may be wound in a roll on a takeup roller (not shown).

To this end, and as shown in FIGS. 1 and 2, the paper transport is provided with a bearing socket 128 for receiving a shaft end of the takeup roller. The other shaft end of the takeup roller (not shown) is received in a corresponding socket 131 that has a spring 132 cooperating with a driving member 133 for releasably retaining the takeup roller in the paper transport.

While rotary drive power is applied to one end of the drive roller 25 at its shaft 28, rotary drive power is derived from the drive roller 25 at its other end via a slip clutch 135 coupled to the shaft 32, a pulley 36 connected to the slip clutch 135, a transmission belt 137 running from the pulley 136 to a pulley 138 connected to the takeup roller shaft receiving socket 131 via a bearing 139 located in the lateral mounting plate 14. In this manner, drive power for the takeup roller is derived from the other end of the drive roller 25 and is applied to the takeup roller 127 via the rotary socket 131.

Various modifications and variations within the spirit and scope of the subject invention will become apparent or suggest themselves to those skilled in the art.

I claim:

1. In a method of releasably retaining any one of several tubular objects of different lengths between a pair of mutually adjustable retention members, the improvement comprising in combination the steps of:
   providing a supporting rod;
   mounting one of said retention members on said supporting rod;
   inserting said supporting rod into any one of said tubular objects;
   moving the other of said retention members along said supporting rod to place said retention members against opposite ends of said one tubular object;
   locking said placed retention members against movement away from each other;
   mounting said supporting rod; and
   resiliently biasing said supporting rod in an axial direction.

2. A method as claimed in claim 1, wherein:
   said one retention member is attached to said supporting rod.

3. A method as claimed in claim 1 or 2, including the step of:
   making said other retention member axially movable on, and removable from an end of, said supporting rod.

4. A method as claimed in claim 1 or 2, including the step of:
   making said other retention member infinetely adjustable along a portion of said supporting rod, and removable from an end portion of said supporting rod.

5. A method as claimed in claim 1 or 2, including the step of:
   providing said supporting rod with an external thread along a portion thereof; and
   providing said other retention member with an internal thread meshing with said external thread.

6. A method as claimed in claim 1, wherein:
   said mounting includes the step of mounting said supporting rod for rotation about an axis;
   said mounted supporting rod is rotated about said axis while said placed retention members are locked against movement away from each other; and
   said biasing includes the step of resiliently biasing said mounted supporting rod in an axial direction while said supporting rod is rotated about said axis.

7. A method as claimed in claim 1, including the steps of:
   providing a brake;
   releasably coupling said supporting rod at one end to said brake;
   rotating said coupled supporting rod about an axis; and
   resiliently biasing said rotating supporting rod in an axial direction toward said brake.

8. A method as claimed in claim 6 or 7, wherein:
   said one retention member is attached to said supporting rod.

9. A method as claimed in claim 6 or 7, including the step of:
   making said other retention member axially movable on, and removable from an end of, said supporting rod.

10. A method as claimed in claim 6 or 7, including the step of:
    making said other retention member infinitely adjustable along a portion of said supporting rod, and removable from an end portion of said supporting rod.

11. A method as claimed in claim 6 or 7, including the step of:
    providing said supporting rod with an external thread along a portion thereof; and
    providing said other retention member with an internal thread meshing with said external thread.

12. In a method of supplying wound material from any one of several rolls of wound material located on different tubular supports of different lengths, with the aid of a pair of mutually adjustable retention members, the improvement comprising in combination the steps of:
    providing a supporting rod;
    mounting one of said retention members on said supporting rod;
    inserting said supporting rod into any one of said tubular supports having a roll of material wound thereon;
    moving the other of said retention members along said supporting rod to place said retention members against opposite ends of said one tubular support;
    locking said placed retention members against movement away from each other;
    mounting said supporting rod for rotation about an axis;

resiliently biasing said supporting rod in an axial direction;

maintaining said resilient bias of said supporting rod during removal of said wound material; and removing wound material from said roll and rotating said one tubular support and said supporting rod.

13. A method as claimed in claim 12, including the steps of:

providing a brake;

releasably coupling said supporting rod at one end of said brake;

braking said rotating supporting rod with said brake; and resiliently biasing said rotating supporting rod in an axial direction toward said brake.

14. A method as claimed in claim 12, or 13, wherein:

said one retention member is attached to said supporting rod.

15. A method as claimed in claim 12, or 13, including the step of:

making said other retention member axially movable on, and removable from an end of, said supporting rod.

16. A method as claimed in claim 12, or 13, including the step of:

making said other retention member infinitely adjustable along a portion of said supporting rod, and removable from an end portion of said supporting rod.

17. A method as claimed in claim 12, or 13, including the step of:

providing said supporting rod with an external thread along a portion thereof; and providing said other retention member with an internal thread meshing with said external thread.

18. In a method of recording information at a recording station on a recording medium strip supplied from any one of several supply rolls located on different tubular supports of different lengths, the improvement comprising in combination the steps of:

providing a supporting rod;

providing a pair of retention members;

mounting one of said retention members on said supporting rod;

inserting said supporting rod into any one of said tubular supports having a supply roll of a recording medium strip wound thereon;

moving the other of said retention members along said supporting rod to place said retention members against opposite ends of said one tubular support;

locking said placed retention members against movement away from each other;

mounting said supporting rod for rotation about an axis, moving the latter recording medium strip from said roll to said recording station and rotating said one tubular support and said supporting rod; and recording information on the latter recording medium strip at the recording station.

19. A method as claimed in claim 18, including the steps of:

resiliently biasing said supporting rod in an axial direction; and maintaining said resilient bias of said supporting rod during recording of information at the recording station.

20. A method as claimed in claim 18, including the steps of:

providing a brake;

releasably coupling said supporting rod at one end to said brake;

braking said rotating supporting rod with said brake; and resiliently biasing said rotating supporting rod in an axial direction toward said brake.

21. A method as claimed in claim 18, 19 or 20, wherein:

said one retention member is attached to said supporting rod.

22. A method as claimed in claim 18, 19 or 20, including the step of:

making said other retention member axially movable on, and removable from an end of, said supporting rod.

23. A method as claimed in claim 18, 19 or 20, including the step of:

making said other retention member infinitely adjustable along a portion of said supporting rod, and removable from an end portion of said supporting rod.

24. A method as claimed in claim 18, 19 or 20, including the steps of:

providing said supporting rod with an external thread along a portion thereof; and providing said other retention member with an internal thread meshing with said external thread.

25. An apparatus for releasably retaining any one of several tubular objects of different lengths, comprising in combination:

a supporting rod insertable into any one of said tubular objects;

a pair of mutually adjustable retention members on said supporting rod for releasably retaining any one of said tubular objects therebetween;

means connected between said retention members for selectively locking said retention members against movement away from each other;

means coupled to said supporting rod for mounting said supporting rod; and means coupled to said supporting rod for resiliently biasing said supporting rod in an axial direction.

26. An apparatus as claimed in claim 25, wherein:

said mounting means include means for mounting said supporting rod for rotation about an axis.

27. An apparatus as claimed in claim 25, wherein:

said one retention member is attached to said supporting rod.

28. An apparatus as claimed in claim 25, 26 or 27, including:

means connected to said other retention member for axial movement of said other retention member on said supporting rod.

29. An apparatus as claimed in claim 25, 26 or 27, including:

means connected to said other retention member for infinite adjustment of said other retention member along a portion of said supporting rod.

30. An apparatus as claimed in claim 25, 26 or 27, including:

an external thread along a portion of said supporting rod; and an internal thread connected to said other retention member and meshing with said external thread.

31. An apparatus for supplying wound material from any one of several rolls of wound material located on diffferent tubular supports of different lengths, comprising in combination:
- a supporting rod insertable into any one of said tubular supports having a roll of material wound thereon;
- a pair of mutually adjustable retention members on said supporting rod for releasably retaining any one of said tubular supports therebetween;
- means connected between said retention members for selectively locking said retention members against movement away from each other;
- means coupled to said supporting rod for resiliently biasing said supporting rod in an axial direction at least after said locking of said retention members; and
- means coupled to said supporting rod for mounting said supporting rod for rotation about an axis.

32. An apparatus as claimed in claim 31, including:
- a brake;
- means at one end of said supporting rod for releasably coupling said supporting rod to said brake; and
- means coupled to said supporting rod for resiliently biasing said supporting rod in an axial direction toward said brake.

33. An apparatus as claimed in claim 31, or 32, wherein:
- said one retention member is attached to said supporting rod.

34. An apparatus as claimed in claim 31, or 32, including:
- means connected to said other retention member for axial movement of said other retention member on said supporting rod.

35. An apparatus as claimed in claim 31, or 32, including:
- means connected to said other retention member for infinite adjustment of said other retention member along a portion of said supporting rod.

36. An apparatus as claimed in claim 31, or 32, including:
- an external thread along a portion of said supporting rod; and
- an internal thread connected to said other retention member and meshing with said external thread.

37. An apparatus for recording information at a recording station on a recording medium strip supplied from any one of several supply rolls located on different tubular supports of different lengths, comprising in combination:
- a supporting rod insertable into any one of said tubular supports having a supply roll of a recording medium strip thereon;
- a pair of mutually adjustable retention members on said supporting rod for releasably retaining any one of said tubular supports therebetween;
- means connected between said retention members for selectively locking said retention members movement away from each other;
- means coupled to said supporting rod for mounting said supporting rod for rotation about an axis;
- means for moving the latter recording medium strip from said roll to said recording station and rotating said one tubular support; and
- means for recording information on the latter recording medium strip at the recording station.

38. An apparatus as claimed in claim 37, including:
- means coupled to said supporting rod for resiliently biasing said supporting rod in an axial direction at least during recording of information at the recording station.

39. An apparatus as claimed in claim 37, including:
- a brake;
- means at one end of said supporting rod for releasably coupling said supporting rod to said brake; and
- means coupled to said supporting rod for resiliently biasing said supporting rod in an axial direction toward said brake.

40. An apparatus as claimed in claim 37, 38 or 39, wherein:
- said one retention member is attached to said supporting rod.

41. An apparatus as claimed in claim 37, 38 or 39, including:
- means connected to said other retention member for axial movement of said other retention member on said supporting rod.

42. An apparatus as claimed in claim 37, 38 or 39, including:
- means connected to said other retention member for infinite adjustment of said other retention member along a portion of said supporting rod.

43. An apparatus as claimed in claim 37, 38 or 39, including:
- an external thread along a portion of said supporting rod; and
- an internal thread connected to said other retention member and meshing with said external thread.

44. A method as claimed in claim 1 or 2, including the steps of:
- providing a socket for receiving one end of said supporting rod;
- rendering another end of said supporting rod engageable with a rod retention member;
- exerting on said rod retention member a bias in the direction of said socket;
- engaging said rod retention member with said other end of the supporting rod;
- inserting said one end of the supporting rod into said socket; and
- moving said rod retention member and said supporting rod toward said socket with said bias.

45. A method as claimed in claim 1 or 2, including the steps of:
- inserting an end of said supporting rod into a cup against a spring bias;
- inserting another end of said supporting rod into a socket; and
- permitting said spring bias to move said cup and supporting rod in a direction toward the location of said socket.

46. A method as claimed in claim 18, wherein said mounting of said supporting rod includes the steps of:
- providing a socket for receiving one end of said supporting rod;
- rendering another end of said supporting rod engageable with a rod retention member;
- exerting on said rod retention member a bias in the direction of said socket;
- engaging said rod retention member with said other end of the supporting rod;
- inserting said one end of the supporting rod into said socket; and
- moving said rod retention member and said supporting rod toward said socket with said bias.

47. A method as claimed in claim 18, wherein said mounting of said supporting rod includes the steps of:
inserting an end of said supporting rod into a cup against a spring bias;
inserting another end of said supporting rod into a socket; and
permitting said spring bias to move said cup and supporting rod in a direction toward the location of said socket.

48. An apparatus as claimed in claim 25, including:
a socket for receiving one end of said supporting rod;
a rod retention member engageable by another end of said supporting rod; and
means for exerting on said rod retention member a bias in the direction of said socket and for moving said rod retention member and said supporting rod toward said socket with said bias.

49. An apparatus as claimed in claim 25, including:
a socket for receiving one end of said supporting rod;
a cup for receiving another end of said supporting rod; and
means for biasing said cup and supporting rod into said socket.

50. An apparatus as claimed in claim 37, wherein said means for mounting said supporting rod include:
a socket for receiving one end of said supporting rod;
a rod retention member engageable by another end of said supporting rod; and
means for exerting on said rod retention member a bias in the direction of said socket and for moving said rod retention member and said supporting rod toward said socket with said bias.

51. An apparatus as claimed in claim 37, wherein said means for mounting said supporting rod include:
a socket for receiving one end of said supporting rod;
a cup for receiving another end of said supporting rod; and
means for biasing said cup and supporting rod into said socket.

52. In a method of recording information at a recording station on a recording medium strip supplied from any one of several supply rolls located on different tubular supports of different lengths, the improvement comprising in combination the steps of:
providing a supporting rod;
providing a pair of retention members;
providing a brake;
mounting one of said retention members on said supporting rod;
inserting said supporting rod into any one of said tubular supports having a supply roll of a recording medium strip wound thereon;
moving the other of said retention members along said supporting rod to place said retention members against opposite ends of said one tubular support;
locking said placed retention members against movement away from each other;
mounting said supporting rod for rotation about an axis and releasably coupling said supporting rod at one end to said brake;
moving the latter recording medium strip from said roll to said recording station and rotating said one tubular support and said supporting rod;
braking said rotating supporting rod with said brake;
resiliently biasing said rotating supporting rod in an axial direction toward said brake; and
recording information on the latter recording medium strip at the recording station.

53. A method as claimed in claim 52, wherein:
said one retention member is attached to said supporting rod.

54. A method as claimed in claim 52, including the step of:
making said other retention member axially movable on, and removable from an end of, said supporting rod.

55. A method as claimed in claim 52, including the step of:
making said other retention member infinitely adjustable along a portion of said supporting rod, and removable from an end portion of said supporting rod.

56. A method as claimed in claim 52, including the the steps of:
providing said supporting rod with an external thread along a portion thereof; and
providing said other retention member with an internal thread meshing with said external thread.

57. An apparatus for recording information at a recording station on a recording medium strip supplied from any one of several supply rolls located on different tubular supports of different lengths, comprising in combination:
a brake;
a supporting rod insertable into any one of said tubular supports having a supply roll of a recording medium strip thereon;
means at one end of said supporting rod for releasably coupling said supporting rod to said brake;
means coupled to said supporting rod for resiliently biasing said supporting rod in an axial direction toward said brake;
a pair of mutually adjustable retention members on said supporting rod for releasably retaining any one of said tubular supports therebetween;
means connected between said retention members for selectively locking said retention members against movement away from each other;
means coupled to said supporting rod for mounting said supporting rod for rotation about an axis;
means for moving the latter recording medium strip from said roll to said recording station and rotating said one tubular support; and
means for recording information on the latter recording medium strip at the recording station.

58. An apparatus as claimed in claim 57, wherein:
said one retention member is attached to said supporting rod.

59. An apparatus as claimed in claim 57, including:
means connected to said other retention member for axial movement of said other retention member on said supporting rod.

60. An apparatus as claimed in claim 57, including:
means connected to said other retention member for infinite adjustment of said other retention member along a portion of said supporting rod.

61. An apparatus as claimed in claim 57, including:
an external thread along a portion of said supporting rod; and
an internal thread connected to said other retention member and meshing with said external thread.

* * * * *